J. B. CORNWALL.
GRAIN SCOURER.
APPLICATION FILED APR. 19, 1913.

1,104,631.

Patented July 21, 1914.
2 SHEETS—SHEET 1.

Witnesses
Fenton S. Belt
Donald U. Rich

Inventor
John B. Cornwall
By Arthur E. Sowell
Attorneys

J. B. CORNWALL.
GRAIN SCOURER.
APPLICATION FILED APR. 19, 1913.

1,104,631.

Patented July 21, 1914.
2 SHEETS—SHEET 2.

Witnesses
Fenton S. Belt
Donald N. Rich

Inventor
John B. Cornwall
By Arthur E. Sowell
Attorneys

UNITED STATES PATENT OFFICE.

JOHN B. CORNWALL, OF MOLINE, ILLINOIS, ASSIGNOR TO BARNARD & LEAS MANUFACTURING COMPANY, OF MOLINE, ILLINOIS, A CORPORATION OF ILLINOIS.

GRAIN-SCOURER.

1,104,631.

Specification of Letters Patent. Patented July 21, 1914.

Application filed April 19, 1913. Serial No. 762,428.

*To all whom it may concern:*

Be it known that I, JOHN B. CORNWALL, of Moline, in the county of Rock Island and State of Illinois, have invented certain new and useful Improvements in Grain-Scourers; and I hereby declare that the following is a full, clear, and exact description thereof, reference being had to the accompanying drawings, which form part of this specification.

This invention relates to grain scourers, and is an improvement upon the type of grain scouring and cleaning machine shown in Patent #806,397 granted to me December 5, 1905.

The object of the present invention is to provide means whereby the scouring effect of the rotary beater or scouring cylinder may be regulated, by adjusting the angular positions of the beater blades relative to the axis of such cylinder; and to enable this adjustment to be effected from the outside of the scouring case, and, if desired, while the machine is in operation.

I will explain the invention with reference to the accompanying drawings which form part of this specification so that those skilled in the art can readily understand and utilize same.

While as stated the invention is particularly designed for use in connection with machines of the type shown in my aforesaid patent it is adaptable to other styles of machines and is not restricted to the specific construction shown.

Figure 1:
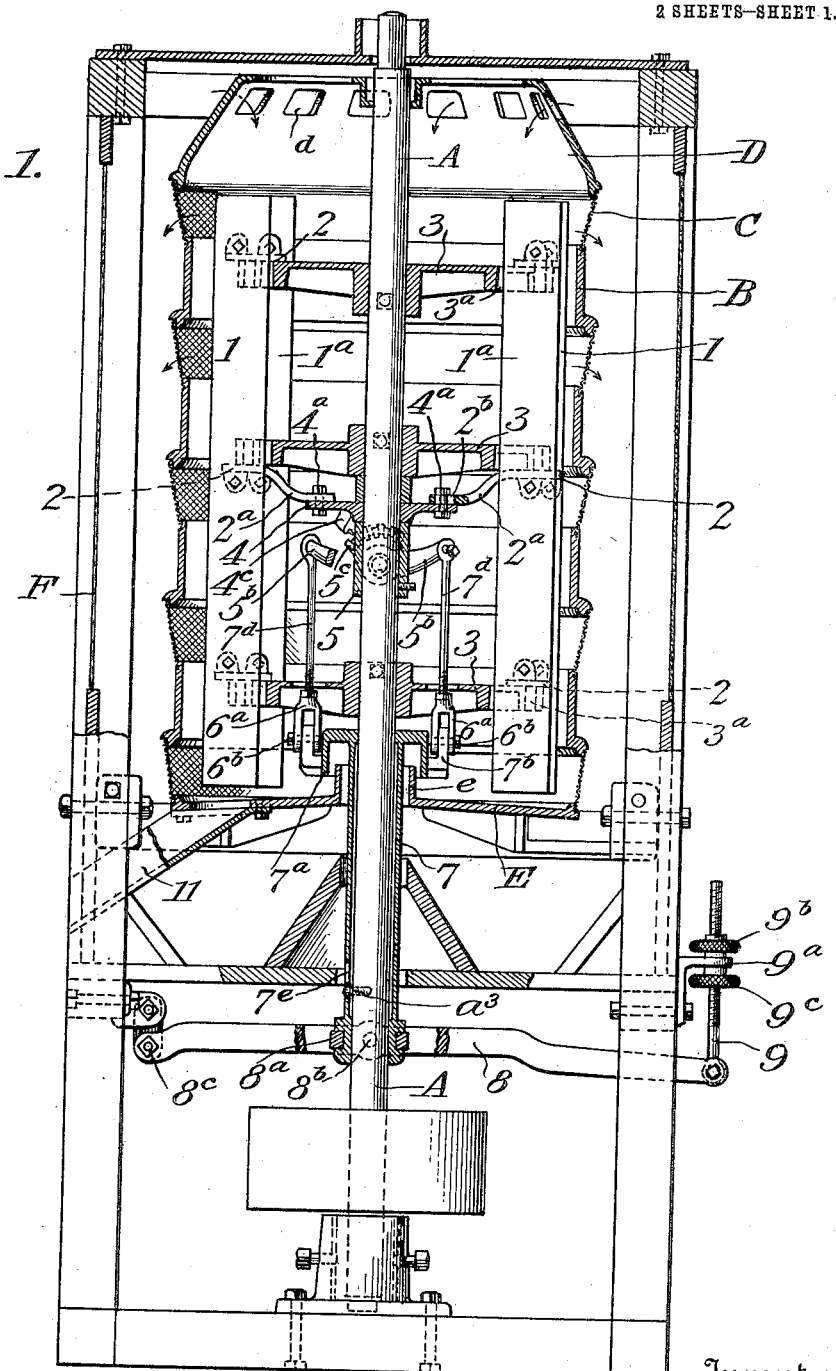
Figure 3:
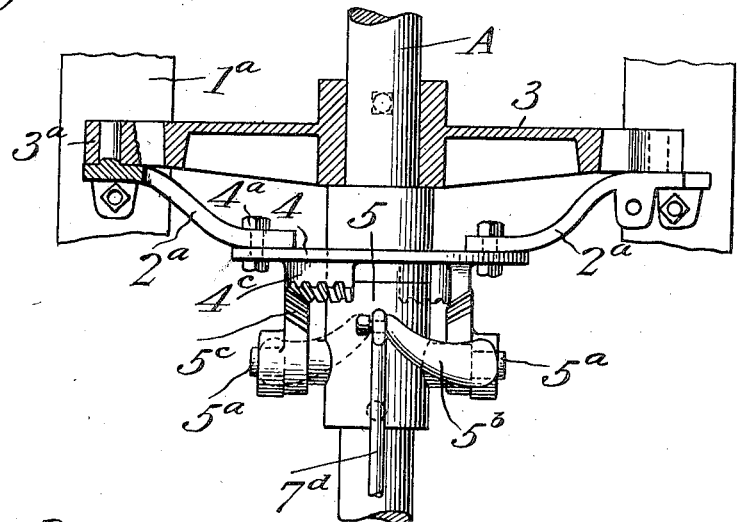
Figure 2:
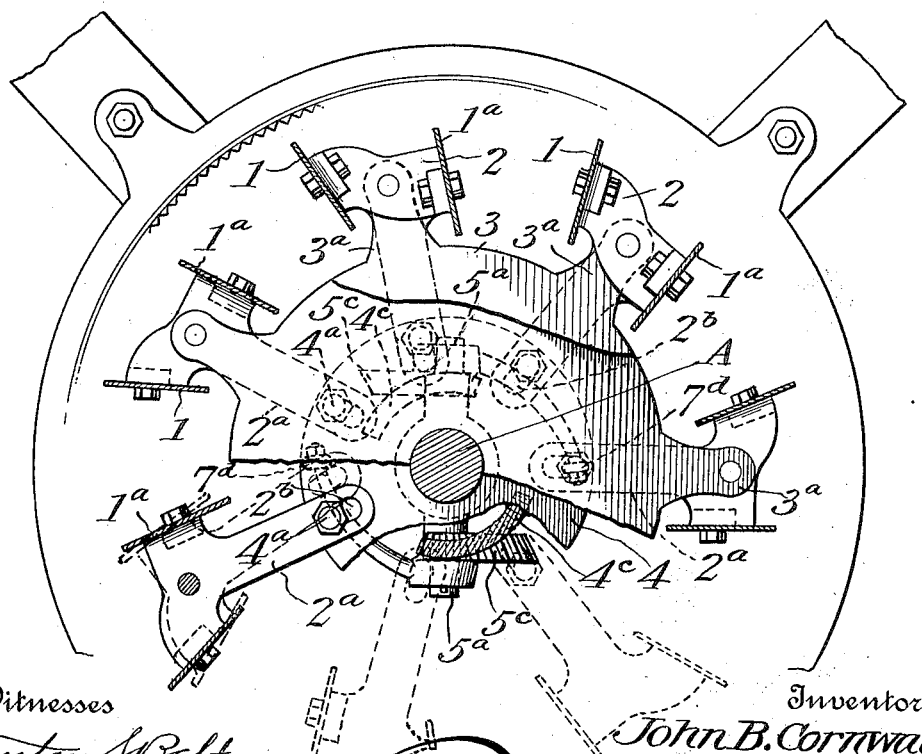

In the drawings—Figure 1 is a vertical central sectional view of the machine. Fig. 2 is a transverse sectional view of the machine partly broken. Fig. 3 is a detail vertical section of the adjusting device.

As illustrated in said drawings the scouring case and cylinder are preferably arranged vertically therein. The scouring case is preferably composed of annular imperforate sections B and interposed annular screen sections C, a top plate or hood D, and a bottom plate E; and this case is contained within a settling chamber formed between the outer walls of the case and the inner walls of the outer frame or casing F of the machine. The aforesaid parts may be constructed and arranged to operate substantially as described in my aforesaid patent, or in any other suitable manner.

The scouring cylinder comprises a main shaft A, disks or spiders 3, and beaters or blades 1ª. The main shaft A of the scouring cylinder extends axially through the scouring case, and the beater or blades are attached to disks or spiders fixed to said shaft. Instead of the beater blades being bolted rigidly to the disks on the beater shaft, as described in my said patent, these blades 1 are attached to plates 2 which are pivoted upon arms 3ª projecting from disks or spiders 3 fixed to shaft A, as shown in the drawings. Preferably the plates 2 project on both sides of their pivots beyond the sides of the arms 3ª, and the blades 1 are attached to the forward ends of said plates 2, and secondary blades 1ª are attached to the rear or following ends of the plates 2. The blades 1, 1ª extend longitudinally of the scouring cylinder and are at opposite sides of the arms 3ª, and preferably stand at different tangential angles to the shaft A, or axis of the scouring cylinder. The blades 1 and 1ª have a counter-balancing effect which is of great value in the practical operation of the machine owing to the high speed at which the scouring cylinder is rotated. The centrifugal force causes the blades to tend to arrange themselves on lines radiating from the axis of the shaft A. This tendency, if not counter-balanced, will exert a strong pull on the revolving disk 4ᶜ and produce an injurious pressure longitudinally of the shaft, but by counter-balancing the blades, this tendency is overcome. One of the sets of plates 2, preferably those attached to the central spider, are pivoted to the under side of said spider, as shown, and are provided with inwardly projecting arms 2ª which have slots 2ᵇ in their inner ends engaging studs 4ª on a rotatorially adjustable disk 4 mounted upon the shaft A beneath said disk and supported in position on the shaft by a collar 5 pinned to the shaft. The disk 4 has on its under sides, at diametrically opposite points, bevel gear portions 4ᶜ, which are respectively meshed by segments 5ᶜ on the ends of opposite levers 5ᵇ pivoted on pins 5ª attached to said collar 5.

The levers 5ᵇ extend in opposite directions and their outer ends are pivotally connected to the upper ends of rods 7ᵈ, and the lower ends of which rods are preferably adjustably connected to a yoke 6ª (as by a screw joint) which yokes are pivotally connected at 6ᵇ to lugs 7ᵇ on the upper end of a sleeve 7 which is loosely fitted to the shaft A and extends through a central opening in the bottom E of the scouring case. Preferably the opening in said bottom plate is surrounded by an upstanding annular flange $e$ which extends within a downturned flange $7^a$ on the upper end of the sleeve 7, as shown, such flange preventing grain leaking or escaping out of the machine at this point.

The sleeve 7 may be kept from rotating on the shaft A in any suitable manner. As shown a stud $a^3$ is attached to the shaft and projects through a longitudinal slot $7^e$ in the sleeve; a suitable washer may be placed on the stud $a^3$ to fit closely in the slot and prevent relative rotatorial movement of the sleeve and shaft.

The lower end of the sleeve 7 is provided with an annular groove in which is loosely mounted a collar $8^a$ that is provided with pins $8^b$ engaged by a yoked lever 8 pivotally connected at one end, as at $8^c$ to the casing; and the other end of the lever is pivotally connected to a rod 9 which extends up through a bracket $9^a$ attached to the casing and is provided with adjusting and locking nuts $9^b$, $9^c$ respectively above and below the bracket $9^a$.

It will be seen that by adjusting rod 9 sleeve 7 can be raised or lowered and the levers $5^b$ will be correspondingly rocked, and the disk 4 will be turned right or left and thus rock the plates 2 on their pivots and change the tangential positions of the beater blades 1, $1^a$, relative to the axis of the scouring cylinder. Thus by adjusting the rod 9 the beater blades may be set at any desired angle in relation to the axis of the scouring cylinder, or scouring case, and thus increase or diminish the space between the outer edges of the said blades and the inner walls of the scouring case. The capability of changing the angles of the blades is most important, as the scouring effect in this machine is obtained by throwing the grain directly outward and against the cylinder in a slanting direction, the angle of which depends upon the adjustment of the blades. By this means the action of the beaters on the grain may be regulated as desired, and the machine can be quickly adjusted, from the outside, and while the machine is in operation, to suit different kinds of grain.

The operation of the machine will be readily understood from the drawings. The grain is alternately scoured and screened as it passes downward through the scouring-case by the action of the blades and the alternate scouring and screening sections.
The clean grain may be discharged through a spout 11, and the dirt and screenings are collected in the outer chamber and may be discharged therefrom in any suitable way. No suction-fan is required, the separation of the grain and dirt being effected by the action of the blades which produce a circuit of air from the scouring-case into the outer chamber through the screen-sections, and air returning into the scouring-case through the apertures $d$ in the hood D.

What I claim is:

1. In a grain scourer, the combination of a scouring chamber, a scouring cylinder therein having longitudinally disposed pivotally mounted counter-balanced blades, and means whereby the angles of the blades to the axis of the scouring chamber may be adjusted from the outside of the chamber.

2. In a grain scourer, the combination of a scouring casing, a scouring cylinder therein having pairs of relatively fixed blades pivotally mounted upon the periphery of said scouring cylinder, and means for adjusting said pairs of blades to vary the angle at which they stand to the axis of the cylinder.

3. In a grain scourer, the combination of a scouring case, a scouring cylinder therein having a series of pairs of longitudinally disposed beater blades pivotally mounted adjacent its periphery; with means for rocking said pairs of blades on their pivots.

4. A scouring cylinder comprising a shaft, spiders thereon, arms pivotally mounted on said spiders, blades attached to the outer ends of said arms, inwardly projecting arms connected with the blades, a disk engaging said arms, means for adjusting said disk, and means outside of the scouring casing controlling the adjusting means.

5. A scouring cylinder comprising a shaft, spiders thereon, arms pivotally mounted on said spiders, blades attached to said arms at opposite sides of the pivots; inwardly projecting arms connected with the blades;
a disk engaging said arms, means for adjusting said disk, and means outside of the scouring casing controlling the adjusting means.

6. A scouring cylinder comprising a shaft, disks thereon, plates pivoted on said disks, beater blades connected to said plates, an adjustable disk on said shaft, arms connected with the blades and loosely engaging said disk, a toothed segment attached to said disk, a toothed lever engaging said segment, a longitudinally movable sleeve on said shaft, and connections between said sleeve and said lever whereby when the sleeve is moved longitudinally the adjustable disk is shifted rotatorially.

7. A scouring cylinder comprising a shaft, disks thereon, plates pivoted on said disks, beater blades connected to said plates, a rotatorially adjustable disk on said shaft, arms connected with the plates and loosely engaging said disk, a toothed segment attached to said disk, a toothed lever engaging said segment and pivotally mounted on the shaft, a longitudinally movable sleeve on said shaft, and connections between said sleeve and said lever whereby when the sleeve is moved longitudinally the adjustable disk is moved rotatorially.

8. In combination, a scouring case, a scouring cylinder therein comprising a shaft, disks thereon, plates pivoted on said disks, beater blades connected to said plates, an adjustable disk on said shaft, arms connected with the blades and loosely engaging said disk, a toothed segment attached to said disk, a toothed lever engaging said segment and pivotally mounted on the shaft, a longitudinally movable sleeve on said shaft, connections between said sleeve and said lever whereby when the sleeve is moved longitudinally the disk is adjusted rotatorially, said sleeve extending out of said scouring case, and means connected with the outer end of said sleeve for adjusting the same, substantially as described.

9. In a grain scourer, the combination of a scouring case, a scouring cylinder therein comprising a shaft extending axially of the scouring case, spiders on said shaft, blades pivoted on said spiders, an adjustable disk mounted on said shaft, connections between said disk and said blades, a lever pivotally mounted on the shaft below said disk and devices for actuating the disk by said lever, a sleeve slidably mounted on the shaft and extending out of the scouring casing, a connection between the inner end of said sleeve and the said lever, and means connected with the outer end of said sleeve for longitudinally adjusting the same, substantially as described.

10. In a grain scourer, the combination of a scouring case, a scouring cylinder therein comprising a shaft extending axially of the scouring case, spiders on said shaft, blades pivoted on said spiders, a rotatorially adjustable disk mounted on said shaft, arms connected with said blades, connections between the said arms and said disks, a lever pivotally mounted on the shaft below said disk and provided with a toothed segment engaging the disk, a sleeve slidably mounted on the shaft and extending out of the scouring casing, a link pivotally connecting the inner end of said sleeve with the said lever, and means connected with the outer end of said sleeve for longitudinally adjusting the same.

11. In a grain scourer, the combination of a scouring case, a scouring cylinder therein comprising a shaft extending axially of the scouring case, spiders on said shaft, plates pivoted on said spiders, blades connected to said plates, a rotatorially adjustable disk mounted on said shaft, and provided with gear-segments, arms connected with said plates, connections between the said arms and said disk, levers pivotally mounted on the shaft below said disk and provided with toothed segments engaging the disk segments, a sleeve slidably mounted on the shaft and extending out of the scouring casing, links pivotally connecting the inner end of said sleeve with the said levers, and means connected with the outer end of said sleeve for longitudinally adjusting the same.

12. In a grain scourer, the combination of a scouring casing, a scouring cylinder therein having beater blade supports pivotally mounted upon its periphery, blades attached to said supports at one side of the pivots, and means for adjusting said supports to vary the angle at which the blades stand to the axis of the cylinder.

13. In a grain scourer, the combination of a scouring case, a scouring cylinder therein having a series of longitudinally disposed beater blade supports pivotally mounted adjacent its periphery; blades attached to said supports at one side of their pivots, and means for rocking said supports on their pivots to vary the angle of the blades to the axis of the cylinder.

14. In a grain scourer, the combination of a scouring chamber, a scouring cylinder therein having longitudinally disposed blade supports pivotally mounted at its periphery; blades mounted on said supports at one side of their pivots; inwardly projecting arms attached to said supports, means in the chamber engaging said arms for varying the angle of the blades to the axis of the scouring cylinder, and means outside of the chamber to adjust the inner means.

15. In a grain scourer, the combination of a scouring case, a scouring cylinder therein having pivotally mounted blade supports, blades mounted on said supports at one side of their pivots, an adjustable disk, and connections between said disk and the blade supports for regulating the angle of the blades.

16. In a grain scourer, the combination of a scouring case, a scouring cylinder therein having pivotally mounted blade supports, blades mounted thereon at one side of their pivots, an adjustable disk, connections between said disk and the blade supports for regulating the angle of the blades, and means whereby the said disk may be adjusted rotatorially of the scouring cylinder from the outside of the casing.

17. In a grain scourer, the combination of a scouring case, a scouring cylinder therein comprising a shaft, spiders attached to the shaft, blade supports pivotally mounted on said spiders, and blades mounted on said supports at one side of their pivots, with a rotatorially adjustable disk mounted on said shaft, and connections between said disk and the blades for regulating the angle of the blades.

18. A scouring cylinder comprising a shaft, spiders thereon, arms pivotally mounted on said spiders, blades attached to said arms at one side of their pivots, inwardly projecting arms connected with the blades, a rotatable disk engaging said arms, and means for adjusting said disk rotatorially of the shaft.

19. In a grain scourer, the combination of a scouring chamber, a rotary scouring cylinder therein having longitudinally disposed pivotally mounted blades, and means whereby the blades can be adjusted to stand at any desired angle to the scouring cylinder from the outside of the cylinder and while the machine is in operation.

20. In a grain scourer, the combination of a scouring chamber, a scouring cylinder therein having longitudinally disposed blades at its periphery, and means whereby the said blades can be adjusted at any desired angle to the opposed surface of the scouring cylinder while the machine is in operation from the outside of the cylinder.

21. In a grain scourer, the combination of a scouring chamber, a scouring cylinder therein having longitudinally disposed pivoted blades at its periphery; inwardly projecting arms attached to said blades; means in the cylinder engaging said arms for holding the blades at any desired angle to the opposed surface of the scouring cylinder whereby said holding means can be adjusted while the machine is in operation and from the outside of the cylinder to adjust the said blades.

22. A scouring cylinder comprising a shaft, spiders thereon, arms pivotally mounted on said spiders, blades attached to said arms, inwardly projecting arms connected with the blades, a rotatable disk engaging said arms, and means whereby the said disk can be adjusted rotatorially of the shaft while the machine is in operation and from the outside of the cylinder.

In testimony that I claim the foregoing as my own, I affix my signature in presence of two witnesses.

JOHN B. CORNWALL.

Witnesses:
WILLIAM EBERT,
JULIUS A. GERWEN.

---

Copies of this patent may be obtained for five cents each, by addressing the "Commissioner of Patents, Washington, D. C."